United States Patent

Ashley et al.

[15] 3,675,124
[45] July 4, 1972

[54] APPARATUS FOR MEASURING FREQUENCY MODULATION NOISE SIGNALS AND FOR CALIBRATING SAME

[72] Inventors: James R. Ashley, Colorado Springs, Colo.; Frank M. Palka, Clearwater, Fla.

[73] Assignee: Sperry Rand Corporation

[22] Filed: Oct. 28, 1970

[21] Appl. No.: 84,673

[52] U.S. Cl. .................................. 324/57, 324/58, 324/95, 325/363
[51] Int. Cl. ......................................... G01r 27/00
[58] Field of Search ................... 325/363; 324/57, 95, 58

[56] References Cited

UNITED STATES PATENTS 3,025,467  3/1962  Gewirtz ............................... 325/263 X
3,350,643  10/1967  Webb ................................... 324/57 X

*Primary Examiner*—Rudolph V. Rolinec
*Assistant Examiner*—David M. Carter
*Attorney*—S. C. Yeaton

[57] ABSTRACT

Apparatus is provided for the measurement of frequency modulation noise on the carrier signal output of a low-noise, low-power, high-frequency diode oscillator under test. An auxiliary injection phase-locked oscillator, driven by the oscillator under test, is used to provide a signal of sufficient level for operation of a high-frequency discriminator used for noise measurement. The auxiliary oscillator may additionally be used for calibration of the discriminator preliminary to taking noise measurements.

6 Claims, 4 Drawing Figures

INVENTORS
JAMES R. ASHLEY
FRANK M. PALKA
BY

ATTORNEY

INVENTORS
JAMES R. ASHLEY
FRANK M. PALKA
BY
ATTORNEY

3,675,124

APPARATUS FOR MEASURING FREQUENCY MODULATION NOISE SIGNALS AND FOR CALIBRATING SAME

The invention herein described was made in the course or under a contract or subcontract thereunder with the United States Air Force.

BACKGROUND OF THE INVENTION

1. Field of the Invention

The invention pertains to means for measurement of noise characteristics of oscillators and more particularly relates to means for the accurate measurement of frequency modulation noise on the carrier output of low-power oscillators, such as cavity stabilized diode oscillators.

2. Description of the Prior Art

Prior art means for the measurement of noise signals include systems that employ high frequency discriminators such that the noise measurement threshold is determined by noise internally generated within the crystal diode detectors of the discriminator. While it has been shown that increasing the input signal applied to such discriminators can reduce the measurement threshold level, such is not compatible with the nature of many semiconductor high-frequency signal sources whose properties require study. The output power capabilities of many such high-frequency signal sources are low and thus measurement of their frequency modulation noise characteristics is not practical using standard methods.

SUMMARY OF THE INVENTION

The present invention relates to means for measurement of the frequency modulation noise on carrier signals from low-power, high-frequency sources such as cavity stabilized semiconductor diode oscillators. An auxiliary injection phase-locked oscillator driven by the oscillator to be tested, provides an output signal in which the noise spectrum of the oscillator to be tested is faithfully reproduced. Furthermore, the signal is of sufficient amplitude for favorable operation of a high-frequency discriminator for noise measurement. In addition, the auxiliary oscillator, operating as a simple oscillator without injection locking, may be frequency modulated in such a manner as to serve to calibrate the measurement system prior to its use as test apparatus.

DESCRIPTION OF THE PREFERRED EMBODIMENT

Figure 1:
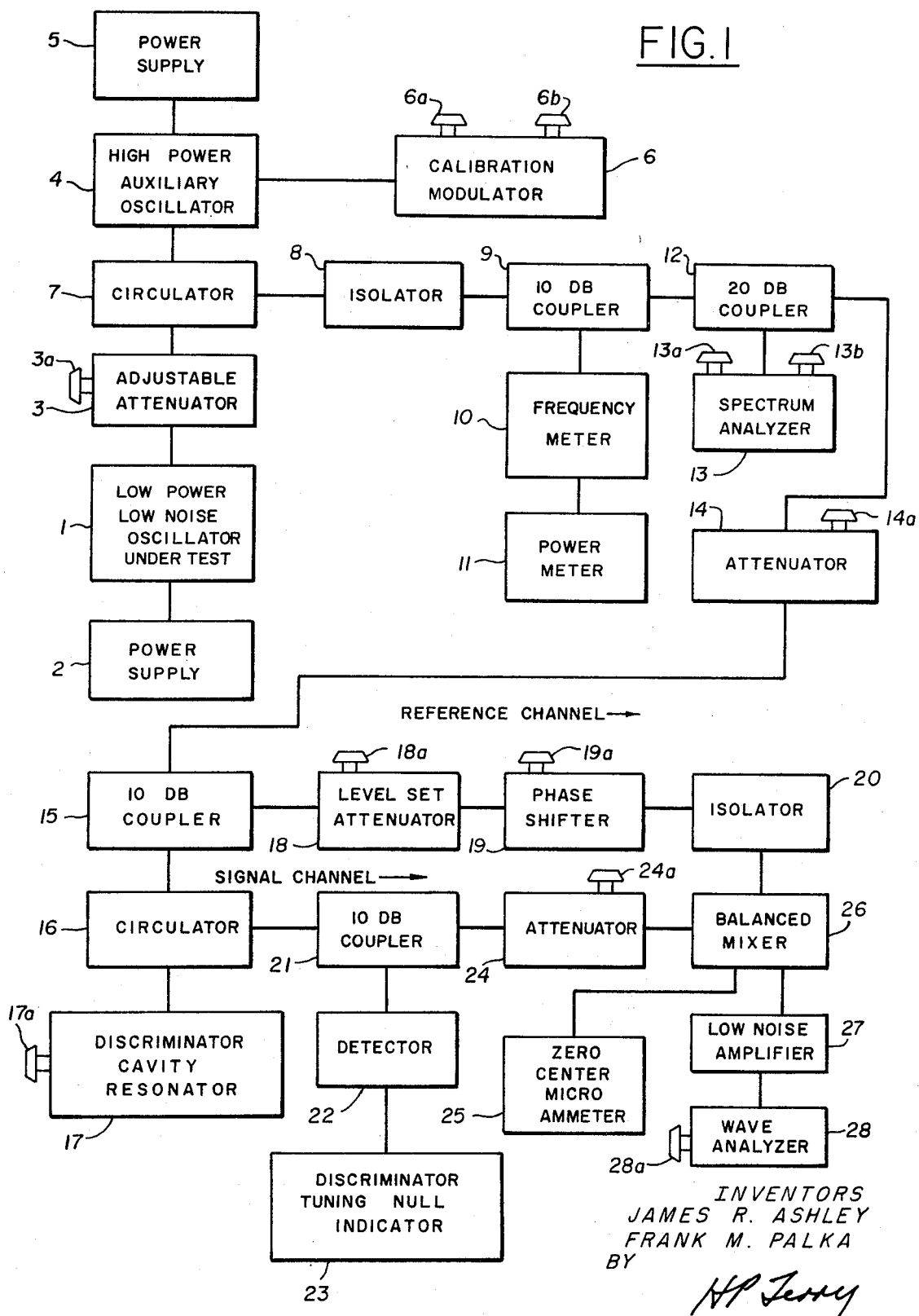
FIG. 1 is a block diagram of apparatus for measuring frequency modulation noise characteristics of oscillators.

FIG. 1 presents apparatus employed, according to the invention, for the measurement of the frequency modulation noise characteristics of an oscillator under examination, which may be typically a transferred electron or avalanche semiconductor microwave diode cavity resonator oscillator. For example, the method is of interest for testing the noise characteristics of a representative device, such as a low-power, low-noise, cavity-stabilized avalanche diode oscillator operating at a carrier frequency of 16 GHz and providing only a 5 milliwatt output power. It will be understood that the apparatus and method of the invention are useful over an extended range of frequency bands and are not at all limited to application merely to microwave or other high carrier frequencies. It will further be understood that the following discussion of the apparatus and method of the invention, though made with reference to a particular operating carrier frequency and to other particular parametric values for convenience in explaining the invention, is not intended to limit its application to such a frequency or to such parametric values.

The low-power, low-noise oscillator 1 to be tested is supplied with power by a conventional power supply 2. Power supply 2 may be of the general type of power supplies conventionally used in other circumstances for operation of oscillator 1, but will be supplied with a particularly effective voltage regulator so as to ensure that it does not itself cause diode oscillator 1 to generate frequency modulation noise caused, for example, by power supply ripple. The output of diode oscillator 1 is supplied through a conventional transmission line adjustable attenuator 3 to a first input of circulator 7, which latter device will be described in further detail. Adjustable attenuator 3 will generally be of the type providing a range of adjustment including 0 to 30 dB. according to the setting of control 3a and is used to adjust the output power of diode oscillator 1 to a desired level.

Circulator 7 has a second input supplied from a relatively high-power auxiliary oscillator 4. In the representative situation, the device selected for use as auxiliary oscillator 4 may be an oscillator producing from 100 to 200 milliwatts output power which can conveniently be frequency modulated, and which is activated by a conventional power supply 5. Auxiliary oscillator 4 may be frequency modulated at a nominally 20 kHz rate for the purpose, as will be seen, of supplying a calibration signal. It is permissible for the frequency modulation noise output of auxiliary oscillator 4 to be higher than that of the low-power oscillator 1 under test; for example, it may be two or three orders of magnitude greater than that of oscillator 1. However, auxiliary oscillator 4 must operate at the same carrier frequency as oscillator 1 and must precisely reproduce the frequency modulation noise of oscillator 1. Accordingly, an oscillator such as a reflex klystron or an unstabilized avalanche diode oscillator may be used for oscillator 4. The calibration modulator 6 may be a conventional audio oscillator capable of frequency modulating auxiliary oscillator 4 at roughly a 20 kHz rate to a peak deviation sufficient to obtain a carrier null in a manner further to be discussed. Oscillator or modulator 6 is preferably a commercially available device of the type equipped with an adjustable output decade attenuator operated by control 6a. It will be seen that the role of the triple-port circulator 7 is to permit auxiliary oscillator 4 to be precisely injection phase locked by the low noise oscillator 1 under test. Circulator 7 will therefore have a substantially 15 dB. minimum isolation and will be characterized by a voltage standing wave ratio less than 1.15 to one. The injection locked oscillator 4 faithfully reproduces the frequency modulation noise signal of the locking signal generated by the oscillator 1 under test, and supplies it through a third port of circulator 7 to isolator 8.

Isolator 8 passes the output signal of the oscillator system to the test equipment channels used according to the invention and particularly provides isolation of auxiliary oscillator 4 from high quality factor or high Q resonant circuits present in the remainder of the test equipment, such as the high Q discriminator cavity 17, as will be further described. The isolation required for isolator 8 depends largely upon the load pulling characteristics of auxiliary oscillator 4. For example, if a reflex klystron is used as auxiliary oscillator 4, a 30 dB. isolator 8 is sufficient. If auxiliary oscillator 4 takes the form of an avalanche diode device, 50 to 60 dB. of isolation may be required of isolator 8 and cascaded transmission line isolators may be required to achieve such a total degree of isolation.

Microwave energy passed by isolator 8 is coupled through a first transmission line directional coupler 9 for obtaining a sample of that microwave signal for measurement purposes. For example, coupler 9 may be a conventional 10 dB. transmission line coupler for passing a calibrated fraction of the energy supplied by isolator 8 to a conventional frequency measurement meter 10 and thence to a conventional power measurement meter 11.

Microwave energy passed by transmission line directional coupler 9 is supplied to a second calibrated transmission line directional coupler 12 which may be a 20 dB. coupler for providing a calibrated sample of the microwave energy to a conventional spectrum analyzer 13. As will be seen, analyzer 13 is used according to the invention to determine that the auxiliary oscillator 4 and that the oscillator 1 under test are tuned to the same carrier frequency.

Microwave energy passing through directional coupler 12 is passed to transmission line adjustable attenuator 14, controllable by adjustment 14a and used to vary the level of power applied to a 10 dB. transmission line directional coupler 15 whose two outputs serve as inputs to a microwave bridge or microwave discriminator circuit comprising first and second channels. The first or reference channel includes a level set transmission line attenuator 18, an adjustable phase shifter 19, and an isolator 20 feeding a first input to a balanced mixer 26. The second or signal channel includes a circulator 16, a discriminator cavity 17, a directional coupler 21, and a transmission line adjustable attenuator 24 feeding a second input of balanced mixer 26.

Transmission line directional coupler 15 is preferably a 10 dB. coupler of high directivity of the order of 30 to 40 dB. Its purpose, as indicated above, is to divide the available power derived from adjustable transmission line attenuator 14, with substantially 10 per cent of the power going into the level set transmission line attenuator 18 of the reference channel and the other 90 per cent going into circulator 16 of the signal channel.

Referring particularly to the elements of the reference channel, level set transmission line attenuator 18 is used to adjust the power input to the reference channel and is adjustable over a range from 0 to 20 dB. The conventional adjustable transmission line phase shifter 19 is employed to adjust by operation of control 19a the phase difference caused by unequal transmission line lengths in the reference and signal channels. Isolator 20 is a conventional transmission line element used to provide on the order of 20 dB. isolation between the reference channel and a first or reference input port to balanced mixer 26.

The first element of the signal channel is a transmission line circulator 16 similar to the triple-port circulator 7. Circulator 16 is used to apply microwave power in the signal channel to discriminator cavity 17 with a minimum of loss. Discriminator cavity 17 is a high Q resonant cavity having conventional means for providing adjustable coupling to circulator 16 and having a certain degree of tunability by virtue of adjustment 17a.

The output of the third port of circulator 16 is passed to a 10 dB. transmission line directional coupler 21, which extracts a sample of the microwave energy passing therethrough for application to a conventional detector 22 to actuate a discriminator cavity tuning null indicator 23. Detector 22 may be a simple transmission line diode detector of the type often used to produce a rectified voltage of amplitude proportional to the amplitude of a microwave or high-frequency signal applied to it. Discriminator cavity tuning null indicator 23 may be an ordinary direct voltage voltmeter or a cathode ray oscilloscope and, as will be seen, is employed as an aid in tuning the cavity resonator of discriminator 17 to the proper frequency. The output of 10 dB. directional coupler 21 is applied through transmission line adjustable attenuator 24 to a second input of balanced mixer 26.

Balanced transmission line mixer 26 may be any of a variety of commercially available devices having a pair of mixer diodes such as the mixers known as the orthomode and orthotee balanced mixers and certain of their antecedents. A zero-center direct current microammeter 25 may be coupled to a conventional output of mixer 26 for the purpose of determining the state of balance of the bridge circuit comprising the above-described reference and signal channels.

The difference frequency output of balanced mixer 26, extracted therefrom in a conventional manner, is applied to low-noise amplifier 27. Device 27 is a high input impedance, low-noise amplifier having a gain of about 40 dB. The gain versus frequency characteristic of amplifier 27 must be substantially flat to within about ±0.5 dB. from a few cycles per second out to about 100 kHz. Amplifier 27 is used to amplify the detected noise voltage up to a level sufficient to be measured conveniently by wave analyzer 28. The output of amplifier 27 is applied to wave analyzer 28, which is a commercially available, tunable, true root-mean-square voltmeter. Since its input signal is a fairly random noise signal, the selected analyzer 28 will have accurately calibrated selectable frequency bands, selectable in a conventional manner one at a time by selector 28a to enable the measurement of a noise voltage over a predetermined band of frequencies. Certain characteristics of analyzer 28 match those of low-noise amplifier 27; for example, both instruments must be useful over a span of frequencies from a few cycles per second to substantially 100 kHz.

A feature of the invention lies in the facility with which the apparatus may be calibrated prior to use in measuring the frequency modulation noise characteristics of an oscillator to be tested. In particular, the connection of auxiliary oscillator 4 into the system makes it easy to calibrate the microwave discriminator. With the signal from oscillator 1 removed, for example, by turning off power supply 2, the auxiliary oscillator 4 may be frequency modulated by calibration oscillator 6 while observing a carrier null with spectrum analyzer 13 to provide the frequency deviation necessary to calibrate the microwave discriminator.

For the above purpose, the following method is used for calibrating the system. First, all level set attenuators, including attenuator 18, are set for maximum attenuation. Calibration modulator or oscillator 6 is turned on and set, for example, at 18.6 kHz. The spectrum analyzer 13 is adjusted in a conventional manner by use of adjustment 13a for an intermediate frequency of 1 to 3 kHz and the horizontal scale deflection of the cathode ray tube display of the analyzer is set for a scale of 30 kHz per centimeter by conventional manual adjustment of control 13b. The voltage output of modulator 6 is adjusted by manipulation of control 6b until the first carrier null is observed on the cathode ray screen of analyzer 13 as shown in FIG. 2.

Figure 2:
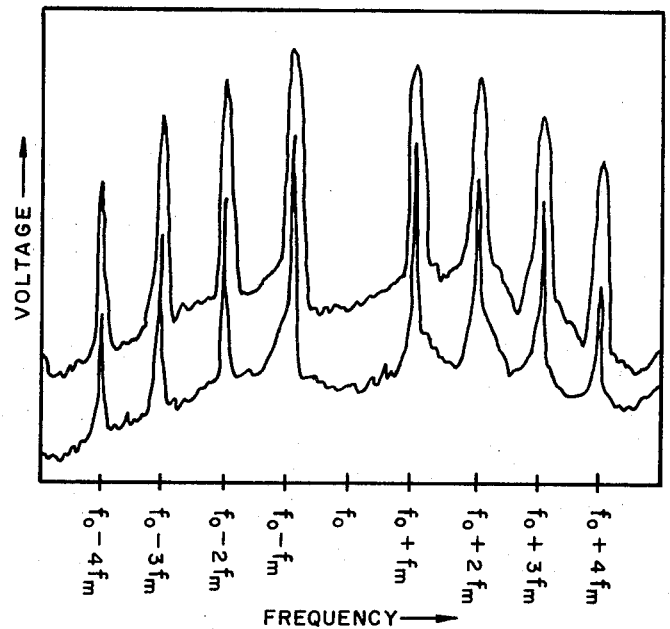
FIGS. 2, 3, and 4 are graphs useful in explaining the operation of the apparatus of FIG. 1.

FIG. 2 is a typical representation of a spectrum analyzer display of the carrier null condition at carrier frequency $f_o$ with successive side bands appearing at $f_o \pm f_m, f_o \pm 2f_m, f_o \pm 3f_m, \ldots, f_o \pm nf_m$, where $f_m$ is the modulation frequency. The benefit of obtaining the display of FIG. 2 is concerned with basic aspects of the modulation process. For a frequency modulated wave, the voltage level of the carrier frequency is proportional to the zero order Bessel function as defined in conventional practice. As the modulation voltage and hence the modulation index is increased, the voltage level of the carrier frequency decreases. When the modulation index is 2.405, the carrier voltage drops to zero. All of the power must then be contained in the side band frequency signals, as is true of the situation in FIG. 2. As is well known, the peak frequency deviation $\Delta f$ is related to the modulation index $m_f$ for a given modulation frequency $f_m$ by the expression:

$$m_f = \Delta f / f_m \qquad (1)$$

Under the condition of carrier null, the modulation index $m_f$ and the modulation frequency (arbitrarily 18.6 kHz) are known and peak frequency deviation can be calculated from Equation 1. By using control 6a to adjust the internal decade attenuator conventionally available within modulator or oscillator 6 a convenient frequency deviation can be established. With the output of oscillator 6 thus imposed on the operation of auxiliary oscillator 4, the apparatus may readily be calibrated.

For accomplishing calibration, the attenuation inserted by attenuator 14 is gradually reduced until a signal is detected and displayed by the discriminator cavity tuning null indicator 23. Adjustment 17a of discriminator cavity resonator 17 is manipulated until discriminator resonator 17 is tuned to the exact frequency of the signal as indicated by meter 23. Exact tuning is shown by a minimum excursion of the needle of indicator 23. In successive steps, the attenuation due to attenuator 14 is reduced and the coupling of discriminator cavity resonator 17 is adjusted, maintaining a minimum indication on null indicator 23 until all of the attenuation of attenuator 14 is removed from the circuit.

Now, the attenuation in the reference channel due to level set attenuator 18 is reduced, allowing 1 to 3 milliwatts of microwave power to flow through the reference channel and isolator 20 to a first input of balanced mixer 26. This power is analogous to the local oscillator power which would be fed into a reference channel of a receiver balanced mixer. The actual amount of power fed to the first input of balanced mixer 26 will vary according to the particular characteristics of the selected balanced mixer, 1 to 3 milliwatts being a representative range of power values.

As a next step, wave analyzer 28 is tuned to the arbitrarily selected modulation frequency (18.6 kHz) and phase shifter 19 is varied until a maximum reading appears on the wave analyzer meter commonly present as a feature of commercially available wave analyzers. If the discriminator resonator 17 has been kept carefully tuned to the operating frequency of oscillator 4, zero-center meter 25 will read zero when the phase shifter 19 is correctly adjusted. A record is then made of the system output voltage as shown by wave analyzer 28. Knowing the value of the applied modulation $\Delta f$, and the resulting voltage $\Delta V$ of the signal from balanced mixer 26, a simple calculation is made of the discriminator characteristic slope $\Delta f/\Delta V$. The calibration oscillator 6 is now turned off and the apparatus is in condition for making a frequency modulation noise measurement of the oscillator 1 to be tested.

The steps taken in calibrating the apparatus, and those followed in making frequency modulation noise tests of a typical oscillator 1 as will now be described, are described in terms of typical circumstances, using typical values of frequencies and other parameters. As previously mentioned, this is done merely as a matter of convenience in explaining the structure and operation of the invention. In testing a different oscillator, other frequencies and other parametric values would of necessity be employed.

After the apparatus is calibrated, a noise measurement of a representative low-noise, low power oscillator 1 may be made. After calibration oscillator 6 is turned off, the attenuation of adjustable attenuator 3 is reduced to admit microwave power from oscillator 1 through circulator 7 to auxiliary oscillator 4 for the purpose of injection locking oscillator 4 to oscillator 1 with a 10 to 20 dB. locking ratio. Expressed in other terms, this means that the locking power is 10 to 20 dB. less than the power generated by auxiliary oscillator 4.

Figure 3:
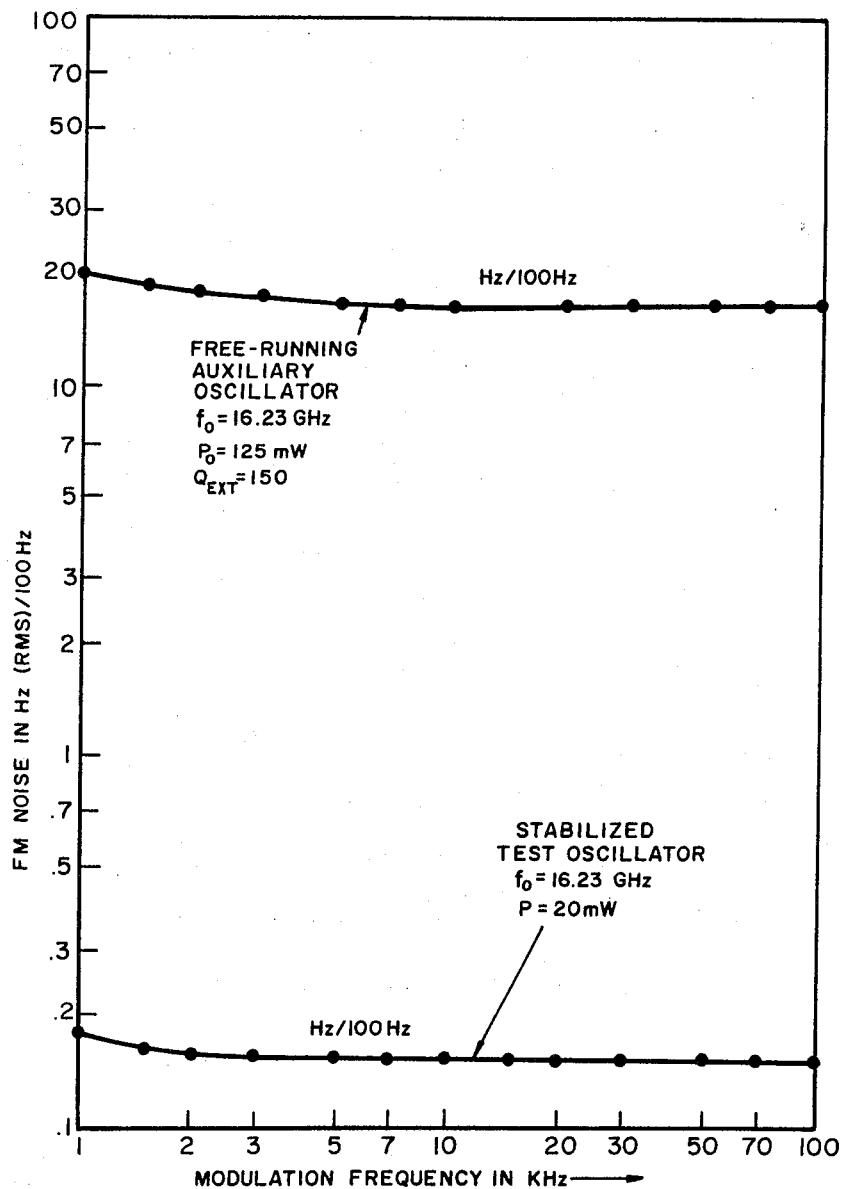

The voltage output of balanced mixer 26 is measured in a conventional manner using wave analyzer 28. The result is a table of values of noise voltage as a function of frequency. Use is now made of the calibration factor $\Delta f/\Delta V$ obtained during the calibration procedure by multiplying each of the noise values in the afore-mentioned table by the value $\Delta f/\Delta V$ to obtain frequency modulation noise in cycles per second as a function of modulation frequency. A typical presentation is that of FIG. 3, in which frequency modulation noise in cycles per second (root-mean-square) per 100 cycles per second is presented as a function of frequency modulation in kHz. The data are for representative oscillators having characteristics other than those of the previously discussed oscillators.

Figure 4:
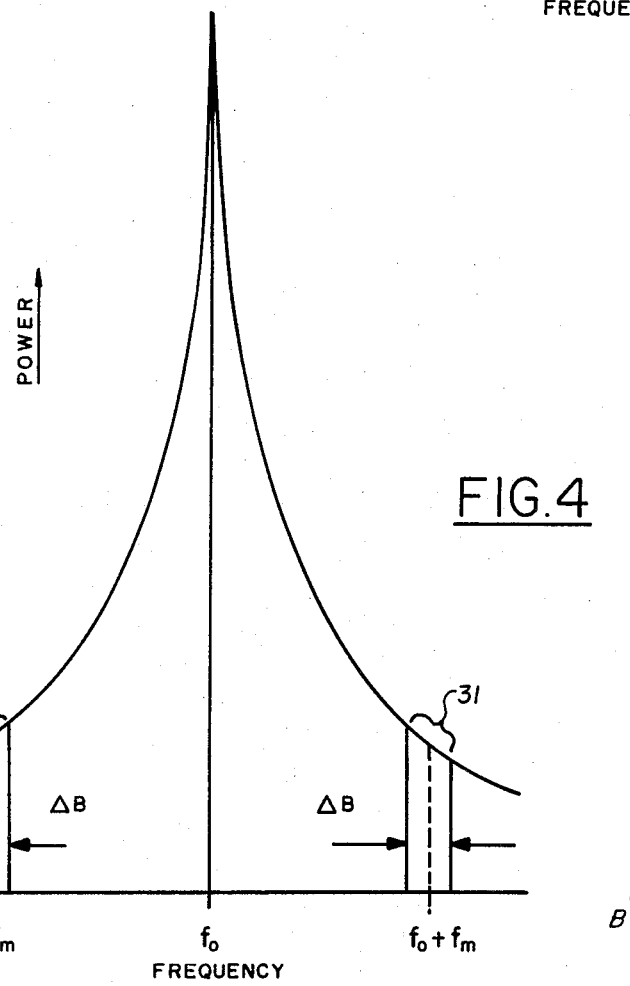

A typical power versus frequency spectrum of a representative microwave oscillator is shown in FIG. 4, where most of the power is closely adjacent the carrier frequency $f_o$. In fact, an ideal or noiseless signal from such an oscillator would have all of the power at the carrier frequency $f_o$. However, in any practical case, frequency modulation noise is present and a significant portion of the power is located at frequencies other than the carrier frequency $f_o$. It will be understood that a measure of the power remote from frequency $f_o$ is a measure of the frequency modulation noise present in the signals.

It is possible to construct the power-frequency spectrum from a number of strips or bands each of band width $\Delta B$, as shown at 30 and 31 in FIG. 4. By application of well known relations which establish understanding of the frequency modulation process, it can be shown that the noise power of each strip band width $\Delta B$, such as strips 30 and 31, can be replaced by an equivalent sinusoidal noise voltage source power which has the same root-mean-square voltage and mean power as the replaced strip or band of noise. Each corresponding equivalent source is then assumed to have a mean frequency located at the center of its noise band $\Delta B$. When a measurement is made according to the novel method of the invention, the value of the equivalent sinusoidal voltage as a function of modulation frequency $f_m$ is obtained in a certain frequency band $\Delta B$. The equivalent sinusoidal voltage is the voltage read on the display of wave analyzer 28. The frequency band $\Delta B$ is the frequency band arbitrarily set into the wave analyzer 28.

It has been noted that prior art systems for measurement of frequency modulation noise employ microwave discriminator apparatus such that the noise measurement threshold is set by the self-noise generated in crystal detectors. Increasing the input signal applied to the discriminator advantageously reduces the measurement threshold. However, measurements are often to be made on semiconductor diode and other signal sources having limited power outputs and this makes the use of prior art methods difficult. The problem of the prior art methods is overcome by employing an injection phase locked oscillator as an input to the frequency modulation discriminator that permits measurement of 10 to 20 dB. lower power signals than can be achieved using the prior art methods. This significant improvement makes possible accurate frequency modulation noise measurements on such low power sources as cavity resonator stabilized IMPATT or GUNN or other diode oscillators. In addition to significantly improving the threshold at which measurements can be made, the injection phase locked oscillator can be frequency modulated in a conventional oscillator mode for easy calibration of the system frequency discriminator.

While the invention has been described in its preferred embodiment, it is to be understood that the words which have been used are words of description rather than of limitation and that changes within the purview of the appended claims may be made without departure from the true scope and spirit of the invention in its broader aspects.

I claim:

1. Apparatus for measuring the frequency modulation noise characteristics of low-power oscillator means comprising:
   regulated power supply means for exciting said low-power oscillator means at a first power output level,
   auxiliary oscillator means operating at a second power output level,
   signal circulator means having first, second, and third port means,
   said low-power oscillator means being coupled to said first port means for supplying a phase locking signal at said second port means to said auxiliary oscillator means,
   said auxiliary oscillator means being adapted to supply through said second port means an output at said third port means,
   isolator means connected to said third port means and having output means,
   first power divider means coupled to said isolator output means and having first and second output means,
   balanced mixer means having first input means, second input means, and output means,
   reference channel circuit means coupling said first power divider first output means to said first input means of said balanced mixer means,
   signal channel circuit means coupling said first power divider second output means to said second input means of said balanced mixer means, and
   wave analyzer means connected to said balanced mixer output means.

2. Apparatus as described in claim 1 further comprising:
   adjustable-voltage calibration-modulator means for frequency modulating said auxiliary oscillator means in the absence of an output from said low-power oscillator means, and
   spectrum analyzer means coupled to the output of said first isolator means for observing the presence of a carrier null upon proper adjustment of said adjustable voltage.

3. Apparatus as described in claim 7 wherein said reference channel circuit means further comprises:
- attenuator means,
- adjustable phase shifter means, and
- isolator means.

4. Apparatus as described in claim 3 wherein said signal channel circuit means further comprises:
- second circulator means having first, second, and third port means
- second power divider means having first input means and first and second output means, and
- attenuator means.

5. Apparatus as described in claim 4 further comprising:
- tunable discriminator resonant cavity means having a coupling port,
- means for coupling said second output means of said first power divider means to said first port of said second circulator means,
- means for coupling said second port means of said second circulator means to said second power divider means, and
- means for coupling said discriminator cavity means through said discriminator cavity coupling port to said third port means of said second circulator means.

6. Apparatus as described in claim 5 further comprising:
- signal rectifier means coupled to said second output means of said second power divider means, and
- null indicator means coupled to said signal rectifier means.

* * * * *